United States Patent
Youtz et al.

(10) Patent No.: US 12,349,094 B2
(45) Date of Patent: Jul. 1, 2025

(54) SYSTEMS AND METHODS FOR HANDLING NON-ACCESS STRATUM LAYER FAILURES

(71) Applicant: Verizon Patent and Licensing Inc., Basking Ridge, NJ (US)

(72) Inventors: Andrew E. Youtz, Princeton, NJ (US); Deepa Jagannatha, Bridgewater, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 474 days.

(21) Appl. No.: 17/808,959

(22) Filed: Jun. 24, 2022

(65) Prior Publication Data

US 2023/0422196 A1    Dec. 28, 2023

(51) Int. Cl.
*H04W 60/00*    (2009.01)
(52) U.S. Cl.
CPC .................................. *H04W 60/00* (2013.01)
(58) Field of Classification Search
CPC .................................................... H04W 60/00
See application file for complete search history.

(56) References Cited

U.S. PATENT DOCUMENTS

2013/0201870 A1*    8/2013    Gupta .................. H04W 76/18
370/254

FOREIGN PATENT DOCUMENTS

CN    114650578 A    *    6/2022    ........ H04W 36/0033

* cited by examiner

*Primary Examiner* — Marcos L Torres

(57) ABSTRACT

A device may include a processor configured to send a plurality of attach requests to a base station using a radio access technology (RAT) and determine that each of the plurality of attach requests has failed. The processor may be further configured to override a triggering of a backoff timer, wherein the UE device is barred from attaching using the RAT if the backoff timer is triggered and running, in response to determining that each of the plurality of attach requests has failed, and send another attach request to the base station using the RAT during a time period associated with the backoff timer.

20 Claims, 6 Drawing Sheets

SYSTEMS AND METHODS FOR HANDLING NON-ACCESS STRATUM LAYER FAILURES

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. For example, as a next generation of a wireless access network is deployed, a legacy wireless access network may be deprecated. Managing transitions between different generation networks may pose various challenges.

DETAILED DESCRIPTION OF EMBODIMENTS

Figure 1:
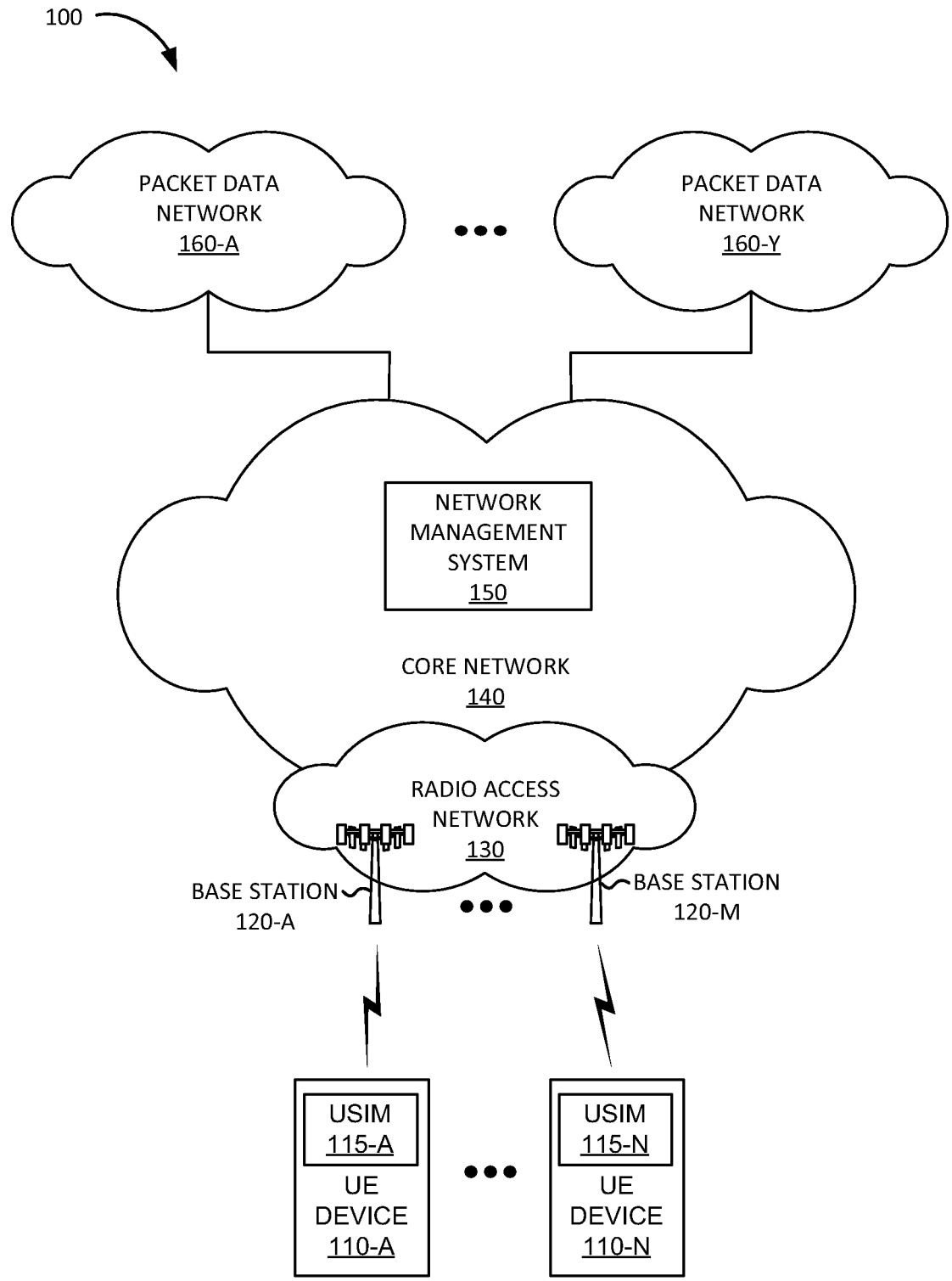
FIG. 1 illustrates an environment according to an implementation described herein.

The following detailed description refers to the accompanying drawings. The same reference numbers in different drawings identify the same or similar elements.

As Fifth Generation (5G) New Radio (NR) wireless networks continue to be deployed and Fourth Generation (4G) Long Term Evolution (LTE) networks continue to provide coverage in many areas, a provider of communication networks may uninstall, and/or remove older generations of Radio Access Technology (RAT), such as Third Generation (3G) networks based on Code Division Multiple Access (CDMA) technology, Universal Mobile Telecommunications System (UMTS) technology, etc. Removal of such legacy networks may result in no alternative networks in areas with reduced LTE coverage.

According to LTE and NR Non-Access Stratum (NAS) standards, an attach request, a tracking area update (TAU) LTE procedure, or an NR registration procedure, may be required to attach a user equipment (UE) device to a base station in a Radio Access Network (RAN). The attach procedure may fail as a result of a lower-layer failure, such as a Random Access Channel (RACH) or Radio Resource Control (RRC) connection setup failure. Thus, a "lower-layer failure," as used herein, refers to a failure to establish an air interface link between a UE device and a base station. If the attach procedure fails repeatedly as a result of a lower-layer failure (as opposed to, for example, a failure in a core network), a backoff timer may be triggered. For example, five attach attempt failures may result in a backoff timer of 12 minutes. While the backoff timer is running, the UE device may be barred from using the RAT to make additional attach attempts. In other words, if the UE device fails to attach to an LTE base station, the UE device may be barred from further attempts to attach to any LTE base stations while the backoff timer is running. Since a legacy network may not be available, the UE device may be in an out-of-service condition for the duration of the backoff timer. The backoff timer may also be triggered when the UE device is connected to a WiFi network and the LTE or NR coverage is poor. Maintaining a UE device in an out-of-service condition for an extended time period may result in poor user experience.

Implementations described herein relate to systems and methods for handling NAS layer failures resulting from lower-layer failures. A UE device, and/or a Universal Subscriber Identity Module (USIM) included in the UE device, may be configured to send a series of attach requests (also referred to as "registration requests" in 5G NR RANs) to a base station using a RAT and determine that each of the attach requests has failed. In response, the UE device, and/or USIM, may override a triggering of a backoff timer that would cause the UE device to be barred from attaching using the RAT during the backoff time (i.e., a period of time while the backoff timer is running) and send another attach request to the base station using the RAT within the backoff time. Sending the other attach request to the base station may include initiating a retry delay timer that is of a shorter duration than the backoff timer and sending the other attach request to the base station using the RAT after the retry delay timer expires (i.e., after the retry delay time runs out). Furthermore, additional attach requests may continue to be sent to the base station (or to another base station cell if cell barring is activated) and thus the attach request procedure may be enabled to be repeated for an indefinite number of retries.

In some implementations, the UE device may receive an instruction from a network management system to assign a particular value to the retry delay timer (e.g., set a retry delay time). The UE device may store the value for the retry delay timer in the USIM, such as, for example, in a NAS configuration field of the USIM.

In some implementations, sending the series of attach requests may include counting attach requests (i.e., determining an attach request count) sent to the base station, setting a time period between attach requests to a first value when the attach request count is below a threshold, and setting a time period between attach requests to a second value that is larger than the first value. In other implementations, sending the series of attach requests may include setting a time period between attach requests to a higher value for each subsequent attach request.

Furthermore, in some implementations, sending the other attach request to the base station using the RAT may include barring the UE device from attaching to a cell of the base station to which attach requests of the plurality of attach requests have been sent and sending the other attach request to another cell associated with the base station or associated with another base station. Furthermore, the UE device may set a barring timer that bars the UE device from attaching to the cell of the base station until the barring timer runs out. Moreover, the UE device may be configured to detect whether the UE device was connected to a wireless local area network (WLAN) network, such as, for example, a WiFi network, and has exited the WLAN network and clear (i.e., inactivate) the barring timer in response.

In some implementations, the UE device and/or USIM may store an attach requests table that relates attach request number values to timer values to a next attach request. For example, the table may be installed on a USIM when a subscription is activated. As another example, the table may be obtained from the network management system using an over-the-air update process. The attach requests table may include at least one entry beyond an attach request number value that would trigger the backoff timer if the backoff timer is not overridden. Additionally, the attach requests table may further relate the attach request number values to entries that indicate whether cell barring should be activated after a particular attach request number. Moreover, different attach request tables may be included for different RATs, such as, for example, a first table for LTE base stations and a second table for NR base stations. Additionally, different attach request tables may be included for different Public Land Mobile Networks (PLMNs), such as, for example, a first table for a home PLMN and a second table for a visited PLMN.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, core network 140, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications.

RAN 130 may include base stations 120. Base station 120 may enable UE device 110 to communicate with core network 140. Base station 120 may be configured for one or more Radio Access Technology (RAT) types. For example, base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may cover a set of base station cells, also referred to as base station sectors. That is, each cell may cover a sector (e.g., a 120° sector, etc.) and include a radio frequency (RF) transceiver configured to send and receive wireless signals in the direction of the sector and be configured to communicate with UE devices 110 using a 5G NR air interface, a 4G LTE air interface, and/or using another type of cellular air interface.

Core network 140 may be managed by a provider of cellular wireless communication services and may manage communication sessions of subscribers connecting to core network 140 via RAN 130. For example, core network 140 may establish an Internet Protocol (IP) connection between UE devices 110 and PDN 160. In some implementations, core network 140 may include a 5G core network. In other implementations, core network 140 may include a 4G core network (e.g., an evolved packet core (EPC) network).

The components of core network 140 may be implemented as dedicated hardware components or as virtualized functions implemented on top of a common shared physical infrastructure using Software Defined Networking (SDN). For example, an SDN controller may implement one or more of the components of core network 140 using an adapter implementing a VNF virtual machine, a Cloud Native Function (CNF) container, an event driven serverless architecture interface, and/or another type of SDN component. The common shared physical infrastructure may be implemented using one or more devices 200 described below with reference to FIG. 2 in a cloud computing center associated with core network 140.

Core network 140 may include a network management system 150. Network management system 150 may include one or more computer devices, such as server devices, configured to manage RAN 130 and/or communication between UE devices 110. For example, network management system 150 may manage attachment configurations for UE devices 110 and may provide one or more attach request settings to UE devices 110. For example, network management system 150 may provide one or more attach requests table to UE device 110 using an over-the-air process. UE device 110 may use a provided attach requests table when attempting to make future attach requests to base station 120.

PDNs 160-A to 160-Y may each include a PDN. A particular PDN 160 may be associated with a Data Network Name (DNN) in 5G, and/or an Access Point Name (APN) in 4G, and a UE device may request a connection to PDN 160 using the DNN or APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
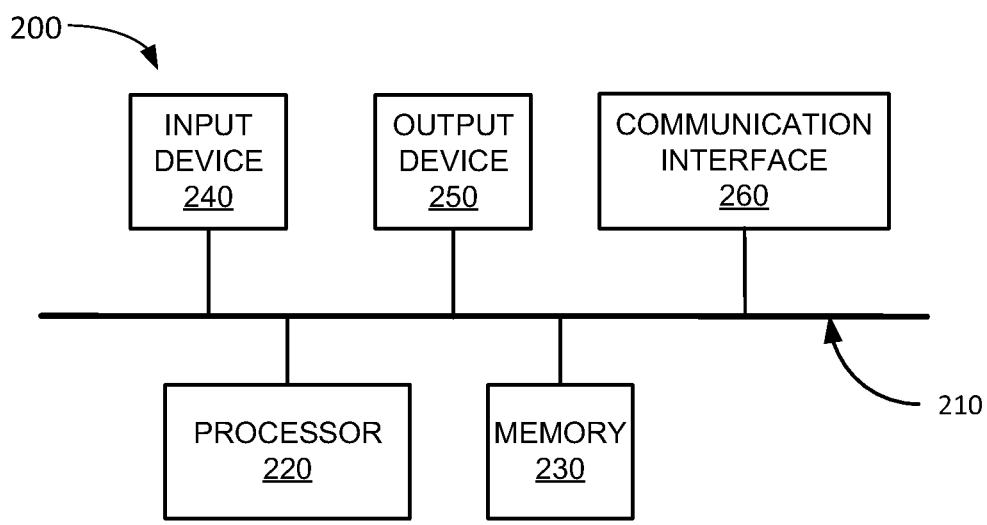
FIG. 2 is a diagram illustrating exemplary components of a device that may be included in a component of an environment according to an implementation described herein.

FIG. 2 illustrates example components of a device 200 according to an implementation described herein. UE device 110, USIM 115, base station 120, network management system 150, and/or other components of environment 100, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to handling NAS layer failures resulting from lower-layer failures. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
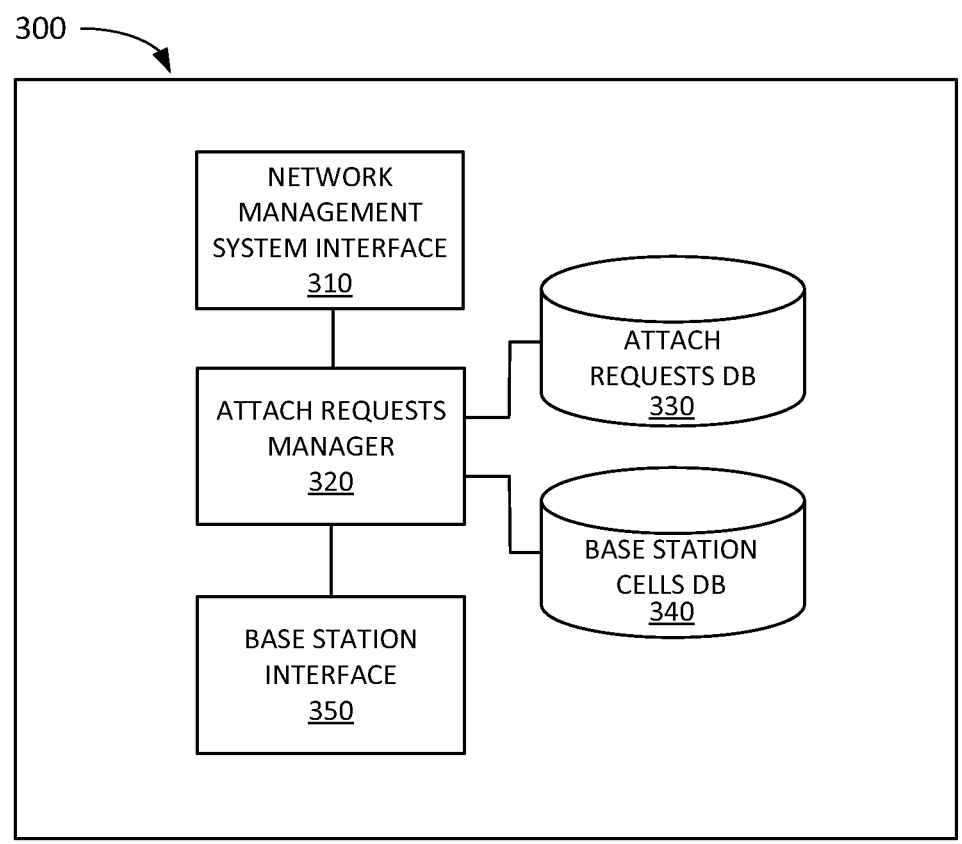
FIG. 3 is a diagram illustrating exemplary components that may be included in the user equipment (UE) device or Universal Subscriber Identity Module (USIM) according to an implementation described herein.

FIG. 3 is a diagram illustrating exemplary components of a device 300 that may be correspond to UE device 110 and/or USIM 115. The components of device 300 may be implemented, for example, via processor 220 executing instructions from memory 230. Alternatively, some or all of the components of device 300 may be implemented via hard-wired circuitry. As shown in FIG. 3, device 300 may include a network management system interface 310, an attach requests manager 320, an attach requests database (DB) 330, a base station cells DB 340, and a base station interface 350.

Network management system interface 310 may be configured to communicate with network management system 150. For example, network management system interface 310 may receive one or more attach requests tables from network management system 150 to be stored in attach requests DB 330.

Attach requests manager 320 may manage attach requests sent by UE device 110 to base station 120. For example, attach requests manager 320 may select an attach requests table from attach requests DB 330 and send a series of attach requests to base station 120. If an attach request is accepted, attach requests manager 320 may cease sending attach requests to base station 120. If an attach request fails (e.g., no response is received from base station 120, a reject or error message is received from base station 120, etc.), attach requests manager 320 may wait a particular length of time based on a retry timer and then send another attach request to base station 120. Attach requests manager 320 may continue to send attach requests to base station 120 using retry timers specified in the selected attach requests table until an attach request is accepted. Furthermore, attach requests manager 320 may select to activate cell barring for UE device 110 for base station 120 after a particular number of attach requests based on the selected attach requests table, and send subsequent attach requests to another base station 120 identified in base station cells DB 340.

Attach requests DB 330 may store one or more attach requests tables. Exemplary information that may be stored in attach requests DB 330 is described below with reference to FIG. 4. Base station cells DB 340 may store information relating to base station cells detected by UE device 110. For example, base station cell DB 40 may store a record for a particular base station cell detected by UE device 110, a RAT type associated with the particular base station cell, a signal strength detected for the particular base station cell by UE device 110, whether the UE device 110 is barred from sending an attach request to the particular base station cell, and/or other types of information associated with the particular base station cell. Base station interface 350 may be configured to communicate with base station 120. For example, base station interface 350 may implement an interface for one or more RAT types, such as an LTE air interface and/or an NR air interface.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
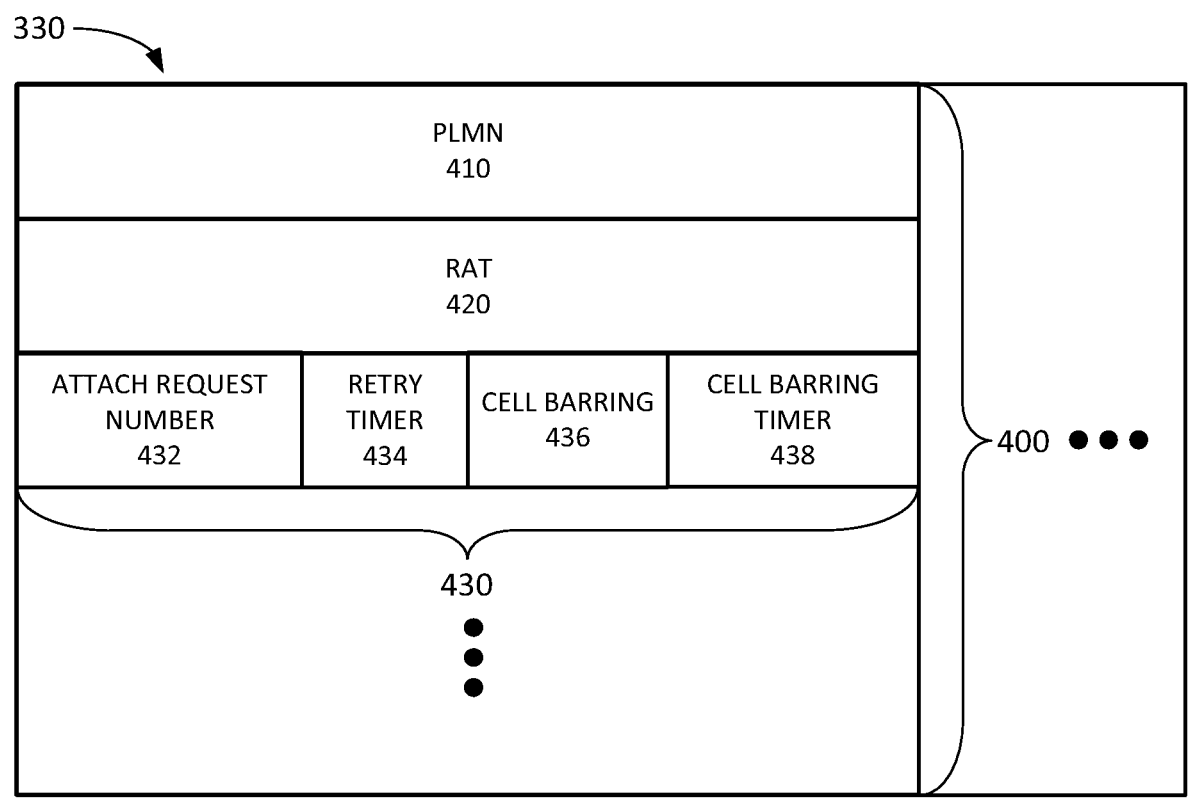
FIG. 4 is a diagram illustrating exemplary components of attach requests database according to an implementation described herein.

FIG. 4 illustrates exemplary components of attach requests DB 330 according to an implementation described herein. In some implementations, attach requests DB 330 may be stored in, or associated with, a NAS configuration field of USIM 115. As shown in FIG. 4, attach requests DB 330 may include attach requests tables 400. Each attach requests tables 400 may store information relating to a particular attach requests table. Attach requests tables 400 may include a PLMN field 410, a RAT field 420, and a set of attach request entries 430.

PLMN field 410 may store information identifying a PLMN for which the particular attach requests table is to be used. For example, PLMN field 410 may identify that the particular attach requests table is to be used in a home PLMN (HPLMN) and/or equivalent HPLMN (EHPLMN). As another example, may identify that the particular attach requests table is to be used in a visited PLMN (VPLMN). As yet another example, PLMN field 410 may identify that the particular attach requests table is to be used in a particular PLMN identified by a PLMN ID.

RAT field 420 may store information identifying a RAT for which the particular attach requests table is to be used. As an example, RAT field 420 may identify that the particular attach requests table is to be used for LTE base station cells. As another example, RAT field 420 may identify that the particular attach requests table and/or registration requests table is to be used for NR base station cells. An attach requests table may be referred to as a registration requests table when used in connection with 5G NR base station cells.

Each attach requests entry 430 may store information relating to making a particular attach request in a set of attach requests to be made. For example, the first attach requests entry 430 may store information relating to making the first attach request, the second attach requests entry 430 may store information relating to making the second attach request, the third attach requests entry 430 may store information relating to making the third attach request, etc. Each attach requests entry 430 may include an attach requests number field 432, a retry timer field 434, a cell barring field 436, and a cell barring timer field 438.

Attach requests number field 432 may identify the attach request number. Retry timer field 434 may store a retry timer value that determines the time duration until the next attach request can be attempted. Cell barring field 436 may store information identifying whether cell barring is to be applied if the attach request is not successful. Cell barring timer field 438 may store a cell barring time which indicates the time duration for the cell barring, if the cell barring is to be applied.

In some implementations, a particular retry timer after each attach request need not be specified. As an example, attach requests table 400 may specify a first value for the retry timer for attach requests counts that are below a threshold value and a second value for the retry timer for attach requests counts that are equal to or above the threshold. For example, when the attach requests counter is below 5, a retry timer of 10 seconds may be used and when the attach requests counter is equal to or greater than 5, a retry timer of 150 seconds may be used.

As another example, attach requests table 400 may specify a telescoping timer for the retry timer and/or the cell barring timer. A telescoping timer may set a time period between attach requests to a higher value for each subsequent attach request. As yet another example, an attach requests counter may be disabled and attach requests may continue to be sent at a particular interval.

Furthermore, in some implementations, attach requests DB 330 may include a default attach requests table 400 that is used when an attach request failure does not result from a lower-layer failure but for another reason. For example, an attach request may fail as a result of a RACH or an RRC connection setup failure, as opposed to failure of a core network 140 component (e.g., a Mobility Management Entity (MME) in a 4G EPC core network 140) to respond to base station 120. UE device 110 may determine that an over-the-air link with base station 120 has been successfully established and yet no attach accept message has been received from base station 120. In such situations, UE device 110 may select to use the default attach requests table 400. In some implementations, use of the default attach requests table 400 may not override the backoff timer.

Although FIG. 4 shows exemplary components of attach requests tables 400, in other implementations, attach requests tables 400 may include fewer components, different components, additional components, or differently arranged components than depicted in FIG. 4.

Figure 5:
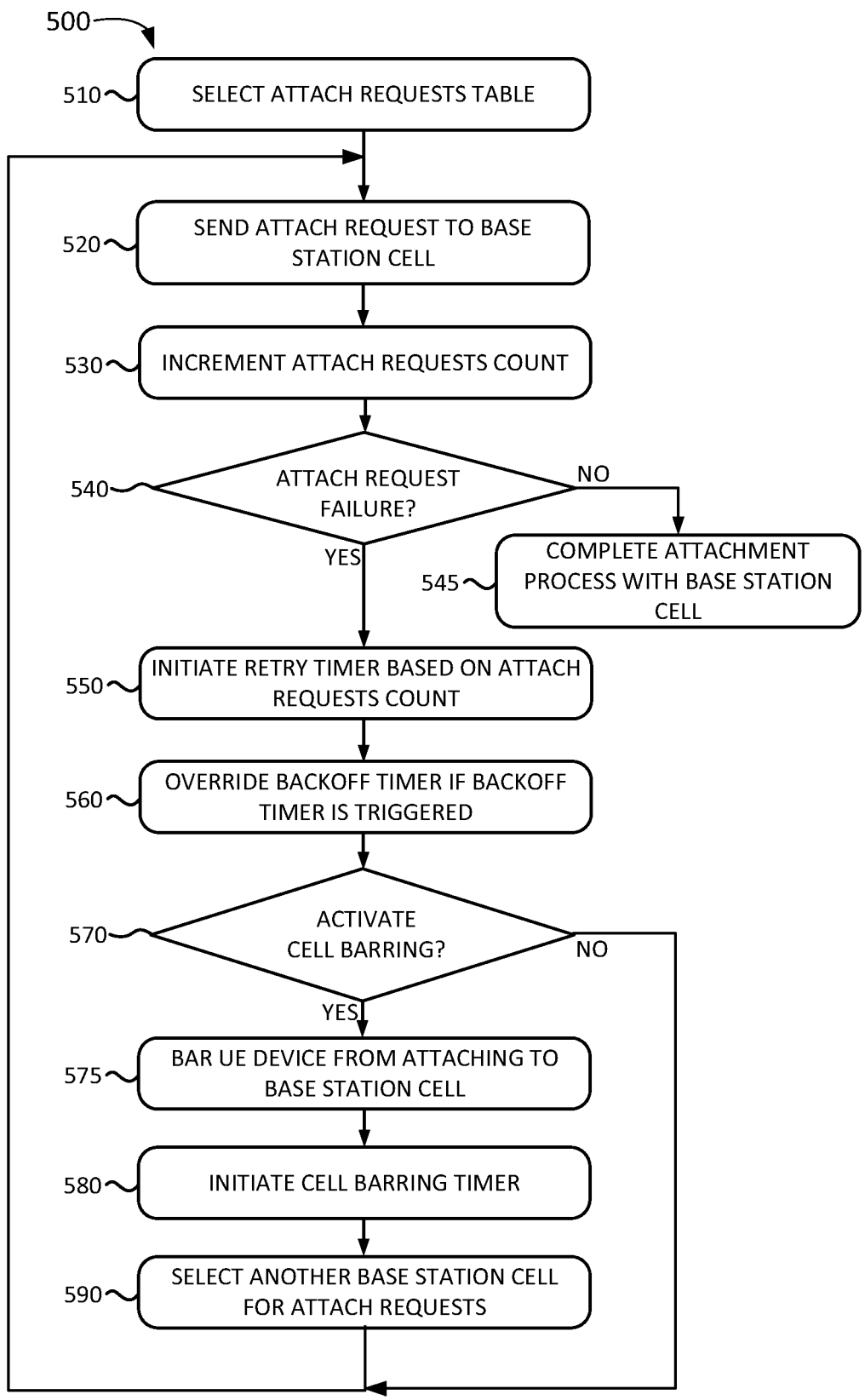
FIG. 5 illustrates a flowchart for handling non-access stratum failures according to an implementation described herein.

FIG. 5 illustrates a flowchart 500 for handling non-access stratum failures according to an implementation described herein. In some implementations, process 500 of FIG. 5 may be performed by UE device 110 and/or USIM 115. In other implementations, some or all of process 500 may be performed by another device or a group of devices.

As shown in FIG. 5, process 500 may include selecting an attach requests table (block 510). UE device 110 may select an attach requests table 400 from attach requests DB 330 based on a PLMN and RAT type. UE device 110 may identify a set of base stations 120 based on wireless signals detected from each base station 120 and may select a detected base station cell associated with the highest signal strength and/or signal quality. For example, if the selected base station cell is in the HPLMN of UE device 110 and corresponds to an LTE base station cell, UE device 110 may select an attach requests table 400 for an HPLMN and LTE and use the selected attach requests table 400 to send attach requests to the selected base station cell.

Process 500 may further include sending an attach request to a base station cell (block 520) and incrementing an attach requests count (block 530). For example, UE device 110 may send an attach request to core network 140 via the selected base station cell and may increment an attach requests count. A determination may be made as to whether the attach request ended in a failure (block 540). For example, UE device 110 may determine whether the attach request has been accepted. If an attach accept message is received from core network 140 via the selected base station cell within a specified time period, UE device 110 may determine that the attach request was successful (block 540—NO), process 500 may continue by completing the attachment process with the base station cell (block 545). For example, for an LTE attachment process, UE device 110 may receive a security mode command, respond with a security mode complete message, receive an RRC Connection Reconfiguration message, respond with an RRC Connection Reconfiguration Complete message, and/or respond with an Attach Complete message. UE device 110 may then request a particular connection (e.g., bearer setup) and start communicating with core network 140 and/or PDN 160 via base station 120.

If an attach accept message is not received from core network 140 via the selected base station cell within a specified time period, UE device 110 may determine that the attach request ended in a failure (block 540—YES). In response, a retry timer may be initiated based on the attach requests count (block 550), and a backoff timer may be overridden if the backoff timer is triggered (block 560). For example, UE device 110 may initiate a retry timer based on the selected attach requests table 400 and the current attach requests count and may wait to send the next attach request until the retry timer has run out. If the current attach requests count triggers a backoff timer (e.g., 5 or more attach requests have been sent), the triggering of the backoff timer may be overridden and the backoff timer may not be initiated. Therefore, UE device 110 may not enter an out-of-service condition for the duration of the backoff timer and may continue to send attach requests to base station 120.

In some implementations, the attach requests count may be disabled and attach requests may continue to be sent at specified intervals. Thus, the attach request procedure may be enabled to be repeated for an indefinite number of retries. Furthermore, in some implementations, UE device 110 may be configured to differentiate between attach request failures resulting from lower-layer failures (i.e., a failure to establish an air interface link with base station 120) and attach request failures resulting from other causes, such as a failure in core network 140 (e.g., a failure of a link or device in core network 140). If the attach request failure is not caused by a lower-layer failure because the air link interface has been successfully established (e.g., an RRC connection setup was successful), process 500 may select a different attach requests process. For example, UE device 110 may select a default attach requests table 400 that may include retry timers of a longer duration than those of other attach requests tables 400 or that may be not result in overriding the triggering of a backoff timer.

Process 500 may further include determining whether to activate cell barring (block 570). For example, UE device 110 may determine whether the entry for the current attach requests count in the selected attach requests table 400 indicates that cell barring is to be activated for the selected base station cell. If it is determined that cell barring is not to be activated (block 570—NO), processing may return to block 520 to send another attach request to the selected base station cell.

If it is determined that cell barring is to be activated (block 570—YES), the UE device 110 may be barred from attaching to the selected base station cell (block 575), a cell barring timer may be initiated (block 580), and another base station cell may be selected for attach requests (block 590). For example, UE device 110 may determine that the entry for the current attach requests count in the selected attach requests table 400 indicates that cell barring is to be activated for the selected base station cell, may bar UE device 110 from the selected base station cell, and may initiate a cell barring timer based on the duration specified in the entry. UE device 110 may then access base station cells DB 340 and select another base station cell to which UE device 110 will send attach requests (e.g., the base station cell associated with the next stronger signal, etc.). In some implementations, UE device 110 may be configured to detect whether UE device 110 was connected to a WLAN network, such as, for example, a WiFi network, and has exited the WLAN network and clear (i.e., inactivate) the barring timer in response. Processing may then return to block 520 to send an attach request to the selected base station cell.

Figure 6:
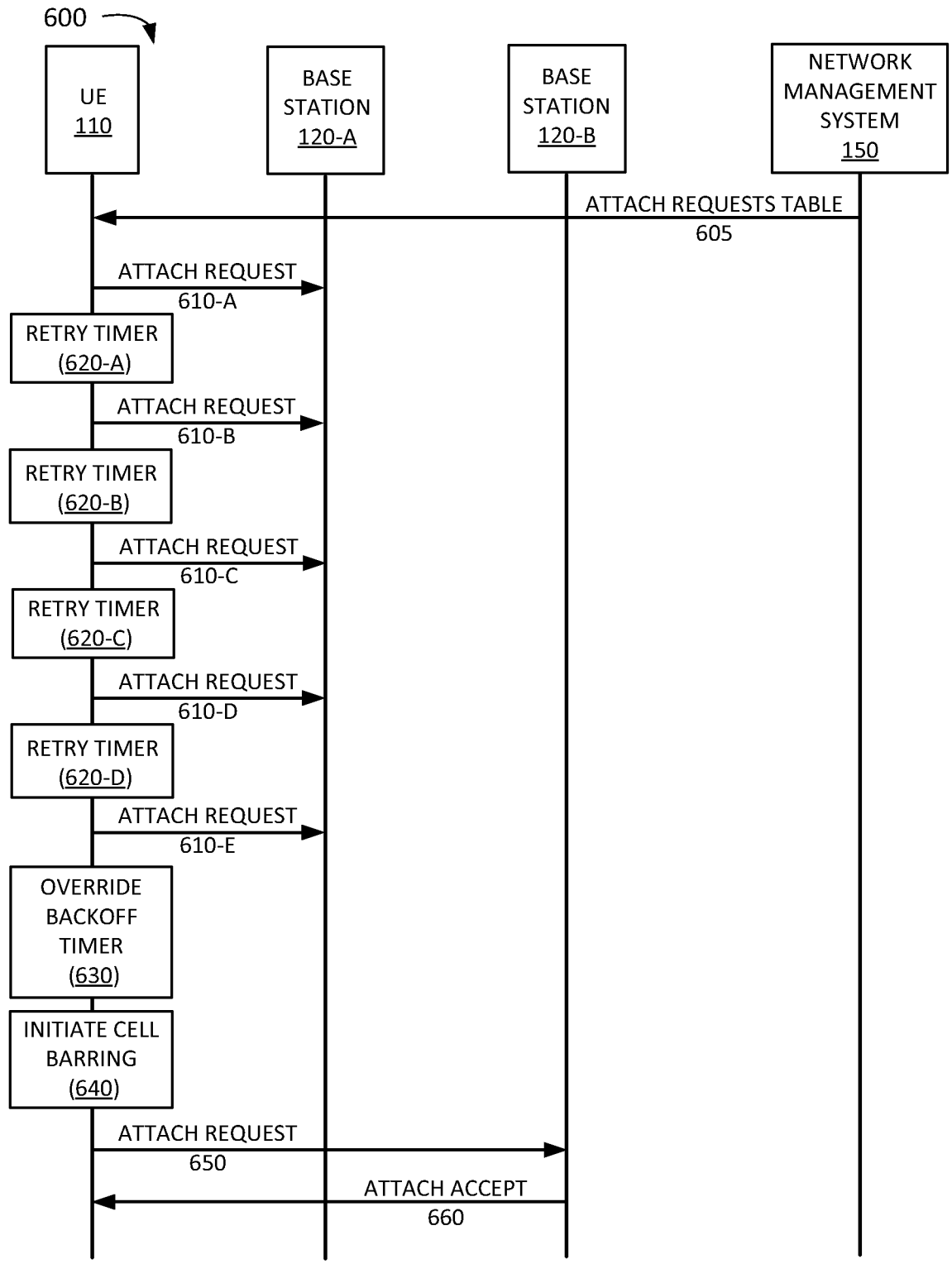
FIG. 6 illustrates an exemplary signal flow according to an implementation described herein.

FIG. 6 illustrates an exemplary signal flow 600 according to an implementation described herein. As shown in FIG. 6, signal flow 600 may include network management system 150 providing one or more attach requests tables 400 to UE device 110 to store in a NAS configuration setting of USIM 115 for use in future attach procedures. In other implementations, the retry behavior for attach requests may be programmed in UE device 110 during manufacture or an initial software configuration of UE device 110.

At a later time, UE device 110 may attempt to attach to RAN 130 while in an area with poor LTE coverage. UE device 110 may select an attach requests table 400 based on the PLMN ID and RAT type associated with base station 120-A and send an attach request to base station 120-A, as UE device 110 may receive the strongest signals from base station 120-A (signal 610-A). UE device 110 may then initiate a retry timer based on the selected attach requests table 400 (block 620-A). UE device 110 may continue to send attach requests and activate retry timers based on selected attach requests table 400 (signal 610-B, block 620-B, signal 610-C, block 620-C, signal 610-D, block 610-D). After the fifth unsuccessful attach request (signal 610-E), UE device 110 may override the backoff timer (block 630) and continue to send attach requests. Furthermore, after the fifth unsuccessful attach request (signal 610-E), UE device 110 may initiate cell barring (block 640) and send the next attach request to base station 120-B (signal 650). If the attach request succeeds (e.g., because of variable RF conditions), base station 20-B may send an attach accept message to UE device 110 (signal 660) and UE device 110 may successfully attach to base station 120-B.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, and a series of signals have been described with respect to FIG. 6, the order of the blocks and/or signals may be modified in other implementations. Further, non-dependent blocks and/or signals may be performed in parallel.

Moreover, while implementations have been described herein that include storing an attach requests table that relates attach request number values to timer values to a next attach request, in other implementations, other types of request tables may be stored and used by UE device 110. As an example, UE device 110 may store and use an LTE Tracking Area Update (TAU) table that relates the number of TAU attempts made to timer values for sending a next TAU message. As another example, UE device 110 may store and use an NR registration procedure table that relates the number of registration requests made to time values for sending a next registration request.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    sending, by a user equipment (UE) device, a plurality of attach requests to a base station using a radio access technology (RAT);
    determining, by the UE device, that each of the plurality of attach requests has failed;
    overriding, by the UE device, a triggering of a backoff timer, wherein the UE device is barred from attaching using the RAT if the backoff timer is triggered and running, in response to determining that each of the plurality of attach requests has failed;
    initiating a retry delay timer, wherein the retry delay timer is of shorter duration than a duration of the backoff timer; and
    sending, by the UE device, a first attach request to the base station using the RAT after the retry delay timer runs out.

2. The method of claim 1, further comprising:
    determining, by the UE device, a cause for failures of the plurality of attach requests.

3. The method of claim 1, further comprising:
    receiving an instruction, from a network device associated with the UE device, to assign a particular value to the retry delay timer.

4. The method of claim 3, further comprising:
    storing the particular value for the retry delay timer in a Non-Access Stratum (NAS) configuration field in a Universal Subscriber Identity Module (USIM) associated with the UE device.

5. The method of claim 1, wherein sending the plurality of attach requests to the base station using the RAT includes:
    determining an attach request count corresponding to a number of attach requests sent to the base station;
    setting a time period between attach requests to a first value when the attach request count is below a threshold; and
    setting a time period between attach requests to a second value when the attach request count is equal to or above the threshold, wherein the second value is larger than the first value.

6. The method of claim 1, wherein sending the plurality of attach requests to the base station using the RAT includes:
    setting a time period between attach requests to a higher value for each subsequent attach request.

7. The method of claim 1, further comprising:
    barring the UE device from attaching to a cell of the base station to which attach requests of the plurality of attach requests have been sent; and
    sending a second attach request to another cell associated with the base station or associated with another base station.

8. The method of claim 7, further comprising:
    setting a barring timer, wherein the UE device is barred from attaching to the cell of the base station until the barring timer runs out.

9. The method of claim 8, further comprising:
    detecting that the UE device has exited a wireless local area network (WLAN) network; and
    clearing the barring timer, in response to detecting that the UE device has exited the WLAN network.

10. The method of claim 1, further comprising:
storing a table that relates attach request number values to timer values to a next attach request, wherein the table includes at least one entry beyond an attach request number value that would trigger the backoff timer.

11. The method of claim 10, wherein the table further relates the attach request number values to entries that indicate whether cell barring should be activated after a particular attach request number.

12. The method of claim 10, wherein the UE device is configured to use the table when sending attach requests to a Long Term Evolution (LTE) base station, the method further comprising:
storing a first table that relates registration request number values to timer values to a next registration request, wherein the UE device is configured to use the first table when sending registration requests to a New Radio (NR) base station.

13. A user equipment (UE) device comprising:
a processor configured to:
send a plurality of attach requests to a base station using a radio access technology (RAT);
determine that each of the plurality of attach requests has failed;
override a triggering of a backoff timer, wherein the UE device is barred from attaching using the RAT if the backoff timer is triggered and running, in response to determining that each of the plurality of attach requests has failed;
initiate a retry delay timer, wherein the retry delay timer is of shorter duration than a duration of the backoff timer; and
send a first attach request to the base station using the RAT after the retry delay timer runs out.

14. The UE device of claim 13 the processor is further configured to:
determine a cause for failures of the plurality of attach requests.

15. The UE device of claim 13, wherein the processor is further configured to:
receive an instruction, from a network device associated with the UE device, to assign a particular value to the retry delay timer.

16. The UE device of claim 13, wherein, when sending the plurality of attach requests to the base station using the RAT, the processor is further configured to:
determine an attach request count corresponding to a number of attach requests sent to the base station;
set a time period between attach requests to a first value when the attach request count is below a threshold; and
set a time period between attach requests to a second value when the attach request count is equal to or above the threshold, wherein the second value is larger than the first value.

17. The UE device of claim 13, wherein, when sending the plurality of attach requests to the base station using the RAT, the processor is further configured to:
set a time period between attach requests to a higher value for each subsequent attach request.

18. The UE device of claim 13, wherein, the processor is further configured to:
bar the UE device from attaching to a cell of the base station to which attach requests of the plurality of attach requests have been sent;
send a second attach request to another cell associated with the base station or associated with another base station; and
set a barring timer, wherein the UE device is barred from attaching to the cell of the base station until the barring timer runs out.

19. The UE device of claim 13, wherein the processor is further configured to:
store a table that relates attach request number values to timer values to a next attach request, wherein the table includes at least one entry beyond an attach request number value that would trigger the backoff timer, and wherein the table further relates the attach request number values to entries that indicate whether cell barring should be activated after a particular attach request number.

20. A non-transitory computer-readable memory device storing instructions executable by a processor, the non-transitory computer-readable memory device comprising:
one or more instructions to send, by a user equipment (UE) device, a plurality of attach requests to a base station using a radio access technology (RAT);
one or more instructions to determine that each of the plurality of attach requests has failed;
one or more instructions to override a triggering of a backoff timer, wherein the UE device is barred from attaching using the RAT if the backoff timer is triggered and running, in response to determining that each of the plurality of attach requests has failed;
one or more instructions to initiate a retry delay timer, wherein the retry delay timer is of shorter duration than a duration of the backoff timer;
and one or more instructions to send, by the UE device, a first request to the base station using the RAT after the retry delay timer runs out.

* * * * *